United States Patent
Malladi et al.

(10) Patent No.: US 8,768,263 B2
(45) Date of Patent: Jul. 1, 2014

(54) DETERMINING AN UPLINK CONTROL PATH WITH BLIND DECODING

(75) Inventors: Durga Prasad Malladi, San Diego, CA (US); Zhifei Fan, San Diego, CA (US); Hao Xu, San Diego, CA (US); Christian Oliver Thelen, San Diego, CA (US); Zhengwei Liu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 268 days.

(21) Appl. No.: 13/306,690

(22) Filed: Nov. 29, 2011

(65) Prior Publication Data

US 2012/0184314 A1     Jul. 19, 2012

Related U.S. Application Data

(60) Provisional application No. 61/418,492, filed on Dec. 1, 2010.

(51) Int. Cl.
  *H04W 88/02*   (2009.01)
  *H04B 7/00*    (2006.01)

(52) U.S. Cl.
  USPC ........... 455/68; 455/434; 455/515; 455/67.11

(58) Field of Classification Search
  USPC ............... 455/509, 68, 423, 453, 434, 452.1, 455/452.2, 464, 515, 62, 67.11, 500; 370/329, 328, 252
  See application file for complete search history.

(56) References Cited

U.S. PATENT DOCUMENTS 8,064,897 B2 * 11/2011 Matsumoto et al. .......... 455/423
8,542,697 B2 *  9/2013 Kim et al. .................... 370/431
2009/0196366 A1 *  8/2009 Shen et al. .................. 375/260
2010/0039953 A1   2/2010 Zhang
2010/0165931 A1   7/2010 Nimbalker et al.
2011/0032895 A1   2/2011 Englund et al.

FOREIGN PATENT DOCUMENTS

WO   WO2009022790 A1   2/2009
WO   WO2010082757 A2   7/2010
WO   WO2010127316      11/2010

OTHER PUBLICATIONS

Fujitsu: "Summary of email discussion on PUCCH/PUSCH selection", 3GPP Draft, R1-106391, 3rd Generation Partnership Project (3GPP), Mobile Competence Centre, 650, Route Des Lucioles, F-06921 Sophia-Antipolis Cedex, France, vol. RAN WG1, no. Jacksonville, USA, 20101115, Nov. 19, 2010, XP050489887, [retrieved on Nov. 19, 2010].
International Search Report and Written Opinion—PCT/US2011/062570—ISA/EPO—Feb. 23, 2012.

(Continued)

*Primary Examiner* — John J Lee
(74) *Attorney, Agent, or Firm* — Seyfarth Shaw LLP

(57) ABSTRACT

In an aspect, a method assists with blind decoding of uplink control signals on a Physical Uplink Shared Channel (PUSCH) and Physical Uplink Control Channel (PUCCH). The method assists in determining the uplink control path in the event a user equipment (UE) misses an uplink grant and blind decoding occurs. It is determined whether an uplink acknowledgement, rank indicator, and/or channel quality indicator are found on a PUSCH. If not, it is determined whether a scheduling request is expected and whether special handling for the scheduling request is indicated. Depending on those determinations, and whether any decoding attempts for uplink signals are successful, either the PUSCH or PUCCH is selected as the uplink control path.

20 Claims, 6 Drawing Sheets

(56) References Cited

OTHER PUBLICATIONS

Motorola, "Uplink Control Signaling with Persistent Scheduling", 3GPP Draft, R1-080739, 3rd Generation Partnership Project (3GPP), Mobile Competence Centre, 650, Route Des Lucioles, F-06921 Sophia-Antipolis Cedex, France, vol. RAN WG1, no. Sorrento, Italy, 20080206, Feb. 6, 2008, XP050109228, [retrieved on Feb. 6, 2008].

Qualcomm Incorporated: "UCI Transmission for CA", 3GPP Draft; RI-102746 UCI Transmission for CA, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; 20100510, May 4, 2010, XP050419940.

Qualcomm Incorporated: "UCI transmission for CA with and without PUSCH", 3GPP Draft, R1-106350 UCI Transmission for CA, 3rd Generation Partnership Project (3gpp), Mobile Competence Centre, 650, Route Des Lucioles, F-06921 Sophia-Antipolis Cedex, France, vol. RAN WG1, no. Jacksonville, USA, 20101115, Nov. 9, 2010, XP050467013, [retrieved on Nov. 9, 2010].

Texas Instruments: "On PUSCH selection for UCI transmission", 3GPP Draft, R1-105891 TI Pusch CSI Selection REV1, 3rd Generation Partnership Project (3GPP), Mobile Competence Centre, 650, Route Des Lucioles, F-06921 Sophia-Antipolis Cedex, France, vol. RAN WG1, no. Jacksonville, USA, 20101115, Nov. 9, 2010, XP050489430, [retrieved on Nov. 9, 2010].

\* cited by examiner

DETERMINING AN UPLINK CONTROL PATH WITH BLIND DECODING

CROSS REFERENCE TO RELATED APPLICATION

This application claims the benefit of U.S. provisional patent application No. 61/418,492 filed Dec. 1, 2010, in the names of Malladi et al., the disclosure of which is expressly incorporated herein by reference in its entirety.

BACKGROUND

1. Field

Aspects of the present disclosure relate generally to wireless communication systems, and more particularly to determining an uplink control path using blind decoding.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

A method for wireless communication is offered. The method includes receiving an uplink transmission including control channel information and data channel information. The method also includes attempting to decode a first type of control channel information on a data channel when the first type of control channel information is expected in the uplink transmission. The method further includes selecting the data channel to be an uplink control path when the attempt to decode the first type of control channel information on the data channel is successful. The method still further includes attempting to decode the first type of control channel information on a control channel when the attempt to decode the first type of control channel information on the data channel is not successful. The method also includes selecting the control channel to be the uplink control path when the attempt to decode the first type of control channel information on the control channel is successful.

An apparatus for wireless communication is offered. The apparatus includes means for receiving an uplink transmission including control channel information and data channel information. The apparatus also includes means for attempting to decode a first type of control channel information on a data channel when the first type of control channel information is expected in the uplink transmission. The apparatus further includes means for selecting the data channel to be an uplink control path when the attempt to decode the first type of control channel information on the data channel is successful. The apparatus still further includes means for attempting to decode the first type of control channel information on a control channel when the attempt to decode the first type of control channel information on the data channel is not successful. The apparatus also includes means for selecting the control channel to be the uplink control path when the attempt to decode the first type of control channel information on the control channel is successful.

A computer program product for wireless communication is offered. The computer program product includes a non-transitory computer-readable medium having non-transitory program code recorded thereon. The program code includes program code to receive an uplink transmission including control channel information and data channel information. The program code also includes program code to attempt to decode a first type of control channel information on a data channel when the first type of control channel information is expected in the uplink transmission. The program code further includes program code to select the data channel to be an uplink control path when the attempt to decode the first type of control channel information on the data channel is successful. The program code still further includes program code to attempt to decode the first type of control channel information on a control channel when the attempt to decode the first type of control channel information on the data channel is not successful. The program code also includes program code to select the control channel to be the uplink control path when the attempt to decode the first type of control channel information on the control channel is successful.

An apparatus for wireless communication is offered. The apparatus includes a memory and a processor(s) coupled to the memory. The processor(s) is configured to receive an uplink transmission including control channel information and data channel information. The processor(s) is also configured to attempt to decode a first type of control channel information on a data channel when the first type of control channel information is expected in the uplink transmission. The processor(s) is further configured to select the data channel to be an uplink control path when the attempt to decode the first type of control channel information on the data channel is successful. The processor(s) is still further configured to attempt to decode the first type of control channel information on a control channel when the attempt to decode the first type of control channel information on the data channel is not successful. The processor(s) is also configured to select the control channel to be the uplink control path when the attempt to decode the first type of control channel information on the control channel is successful.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
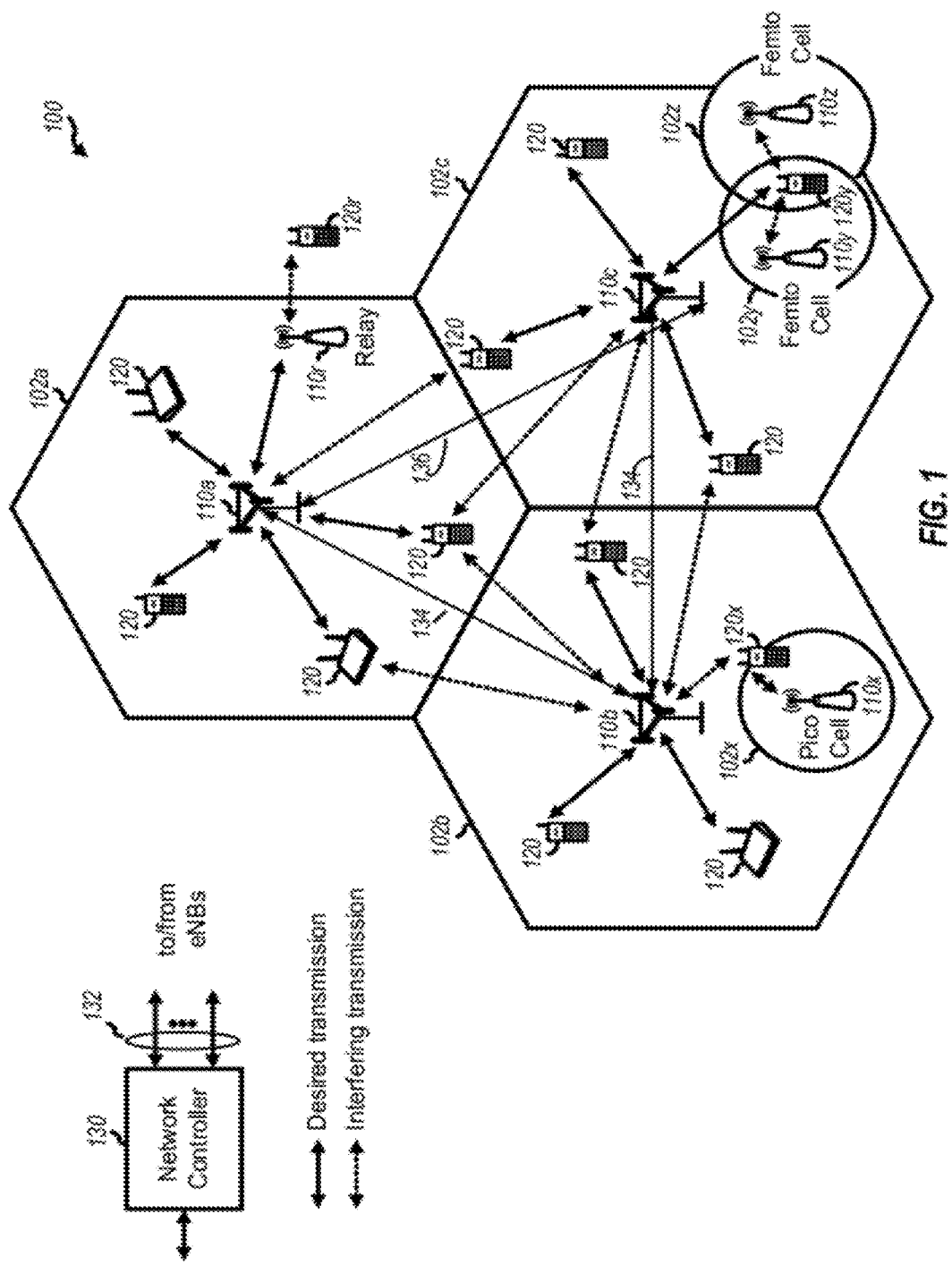
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network, in which determining an uplink control path with blind decoding may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
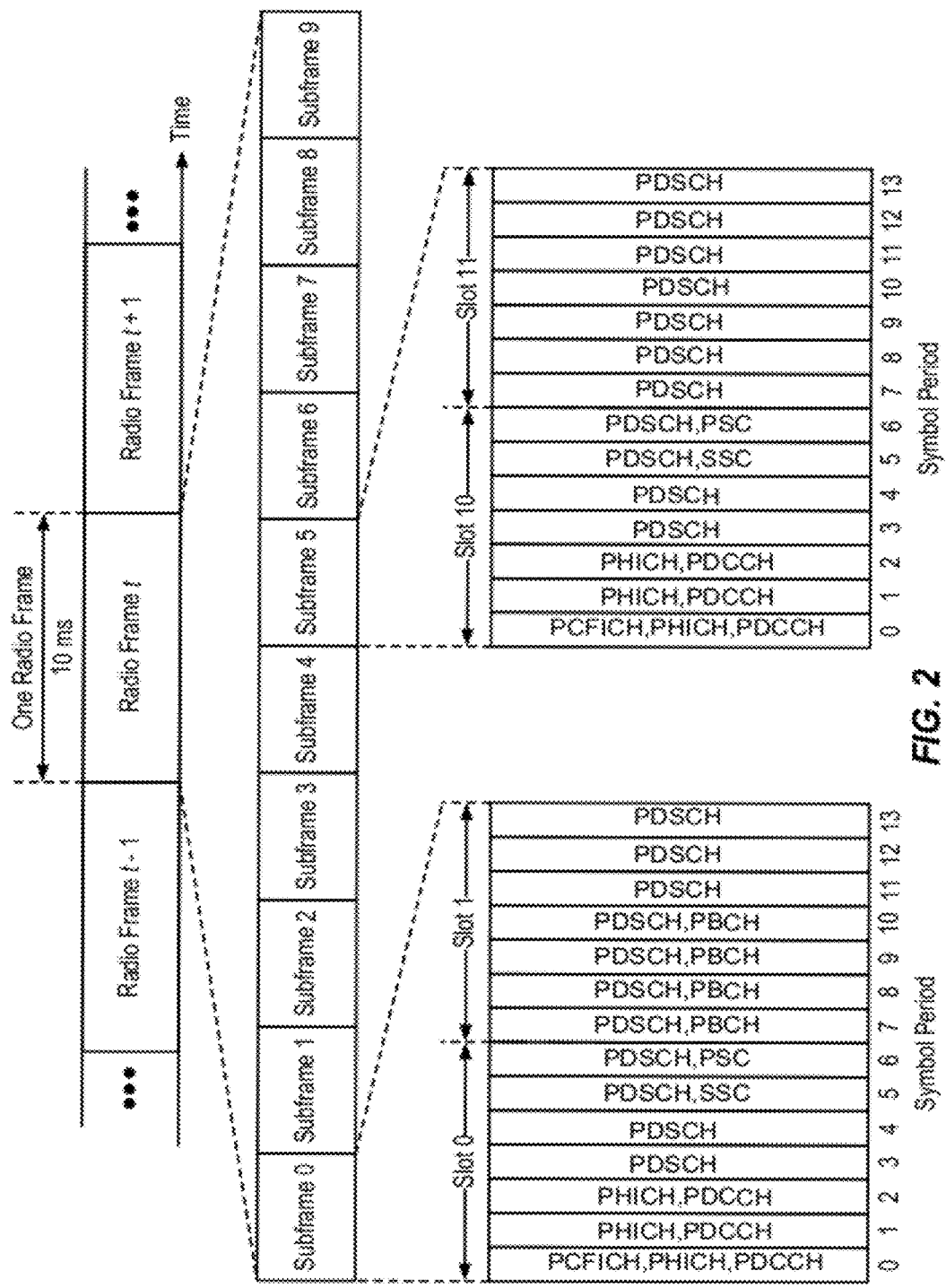
FIG. 2 is a diagram conceptually illustrating an example of a downlink frame structure in a telecommunications system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
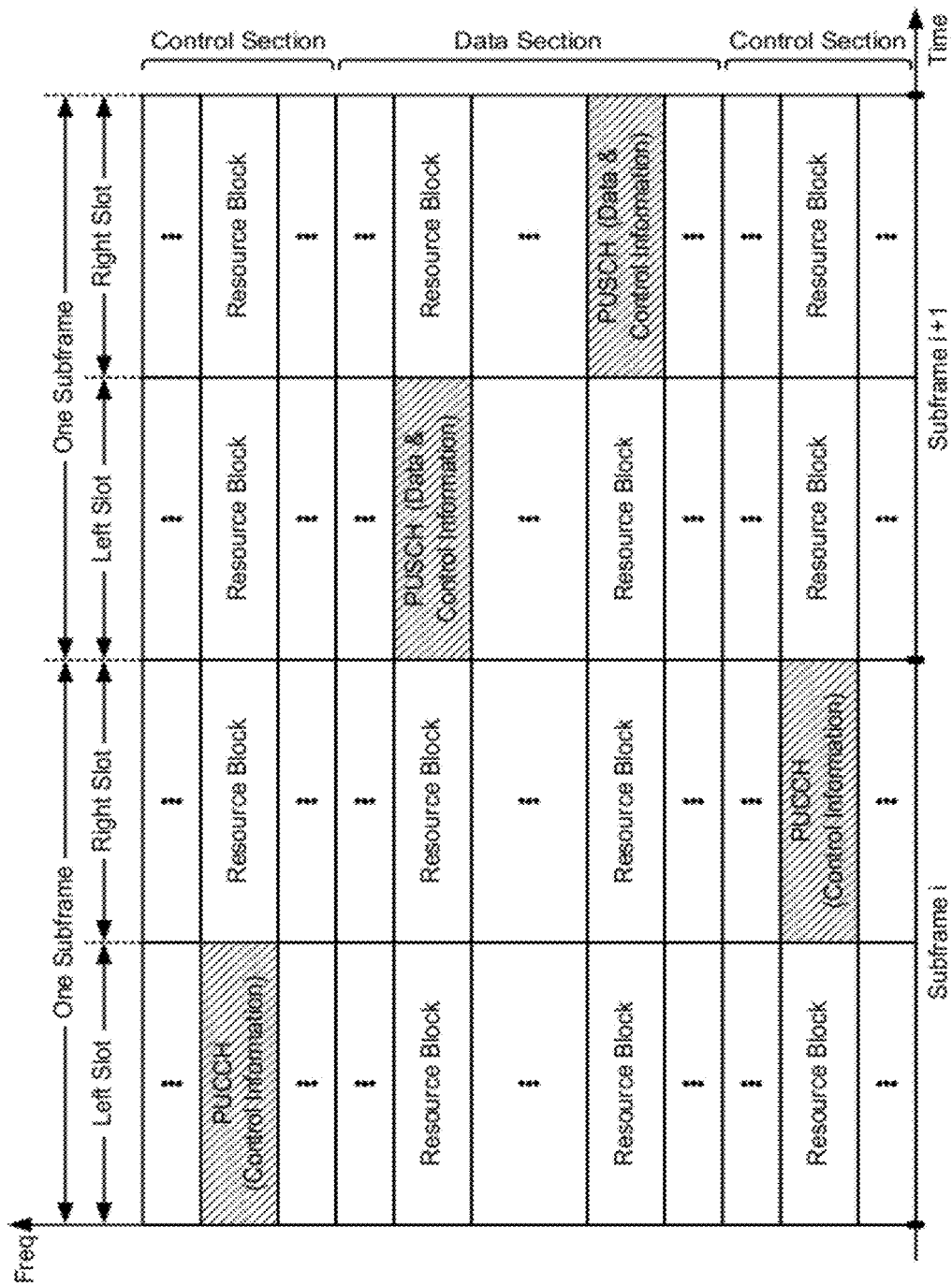
FIG. 3 is a block diagram conceptually illustrating an example frame structure in uplink communications.

FIG. 3 is a block diagram conceptually illustrating an exemplary FDD and TDD (non-special subframe only) subframe structure in uplink LTE/-A communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
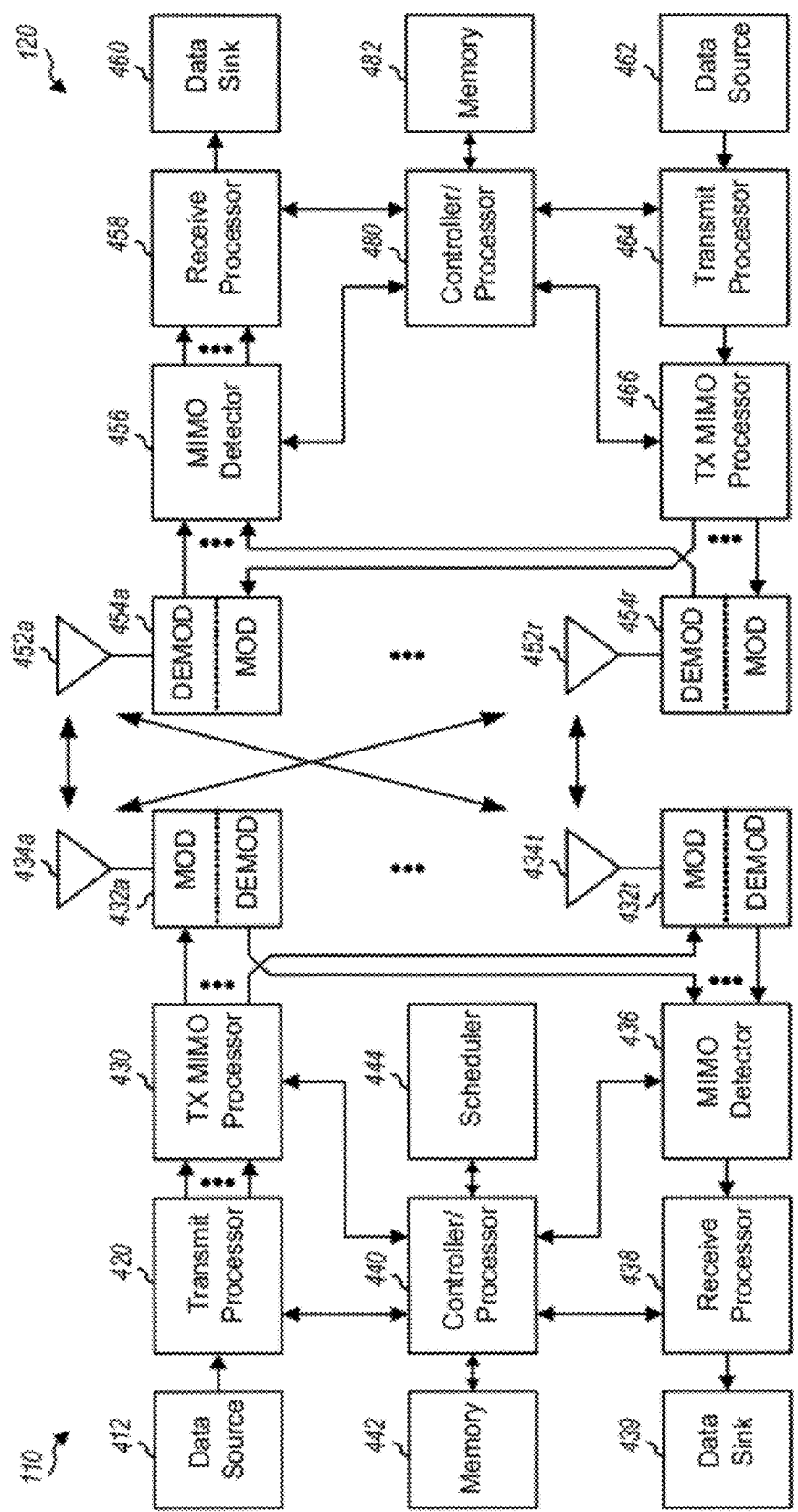
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 5 and 6, and/or other processes for the techniques described herein. The memories 442 and 482 may store data and program codes for the base station 110 and the UE 120, respectively. A scheduler 444 may schedule UEs for data transmission on the downlink and/or uplink.

Determining an Uplink Control Path with Blind Decoding

When a mobile device, i.e., user equipment (UE), is communicating with a base station (eNB), the eNB will send the UE an uplink grant indicating to the UE how the UE is to send control channel information to the eNB. The UE, however, may miss the uplink grant. If this happens, the UE may be transmitting its control information to the eNB in a manner different from what the eNB expects. To solve this problem, a eNB may look for the control information on both a control channel and a data channel and will select one or the other as an uplink control path, based on the eNB's ability to decode control signals from the UE on the respective channels.

In Release 8 LTE uplink communications, based on channel scheduling, different rules apply when multiplexing uplink (UL) control information, uplink data, and UE sounding reference signals (SRS). Various configurations for control information may be employed by a cell of an eNB or a UE. Examples of uplink (UL) control information include a scheduling request (SR), periodic CQI (including rank indicator (RI) or CQI), aperiodic CQI (including RI and CQI), and uplink acknowledgement (UL-ACK). Examples of eNB specific configurations include Simultaneous-Ack/Nack (Acknowledgment/Negative Acknowledgement)-and-SRS (i.e., whether the cell uses shortened physical uplink control channel (PUCCH) format 1 when cell SRS is scheduled). Examples of UE specific configurations include Simultaneous-Ack/Nack-and-CQI (channel quality index) reporting.

When a scheduling request (SR) is scheduled, a UE may transmit a positive scheduling request if the uplink data buffer is not empty, or skip the scheduling request otherwise. When there is no uplink data and no aperiodic CQI (including CQI, precoding matrix indicator (PMI), RI), a scheduling request may be multiplexed with periodic CQI (including RI or CQI), and uplink ACK will be transmitted over the control channel, PUCCH.

When there is uplink data, and/or aperiodic CQI, periodic CQI (including RI or CQI) and uplink ACK will be multiplexed with data, and transmitted over the data channel, PUSCH. The scheduling request is carried inside the media access control (MAC) header as a PUSCH payload. If aperiodic CQI is transmitted alone, without uplink data, and if the UE also transmits a scheduling request, aperiodic CQI will be dropped. When aperiodic CQI collides with periodic CQI, periodic CQI will be dropped.

In addition, when a UE SRS is scheduled at the same subframe, whether the UE SRS will be transmitted or dropped depends on whether the UE will transmit over the PUCCH or the PUSCH. Based on the channel combination, the eNB's configuration, and the UE's configuration, low priority control information and the UE SRS might be dropped.

There is a possibility that a UE may miss an uplink grant. In that case, a UE will transmit uplink control information over the control channel PUCCH. If the eNB only tries to decode the data channel, PUSCH, where the eNB expects the control information to be, the uplink control information will be missed. A cyclic redundancy check may allow the eNB to determine whether it has properly chosen the decoding path, but waiting for the results of a cyclic redundancy check will take too long to be useful for proper decoding timing. This problem may be solved by the eNB blindly decoding the PUSCH and the PUCCH. Blind decoding will allow the eNB to choose the appropriate uplink control path.

Because uplink channel multiplexing depends on several conditions, a well defined PUSCH and PUCCH blind decoding rule can streamline implementation and reduce uplink control information decoding error and decoding time. Offered is a PUSCH versus PUCCH blind decoding rule that does not impact the downlink and uplink processing timeline. The rule may determine a decoding path based on decoding results on each channel.

According to an aspect of the present disclosure, if uplink data and/or aperiodic CQI is expected; and a scheduling request and/or rank indicator and/or uplink ACK and/or CQI is also expected, the eNB will decode uplink control information over both the data channel, PUSCH, and the control channel, PUCCH, by following the uplink control multiplexing rule for each decoding path. Once uplink control decoding results are available, a further blind decoding rule may select the winner of the uplink control decoding path.

One aspect of the rule is presented below. If any of the uplink ACK/CQI/RI is expected on the subframe:

First check the decoding results for uplink ACK/CQI/RI on the PUSCH. If any of them decoded successfully (non-erasure for RI and CQI, non-DTX (discontinuous transmission) for uplink ACK), select the uplink control decoding path to be the PUSCH;

Otherwise, check their decode results on the PUCCH. If any of them decoded successfully, select the uplink control decoding path to be on the PUCCH;

Otherwise, continue to check the scheduling request, as detailed below.

If the scheduling request is not expected, select the uplink control decoding path to be the PUSCH. Otherwise, if the scheduling request is expected:

Alternative 1: A scheduling request may be handled specially from other uplink control information such as an uplink ACK, CQI, etc. If a scheduling request is sent over the PUSCH, it will be included in a media access control (MAC) header as part of the PUSCH payload. Other uplink control information will be multiplexed with PUSCH data, then sent. When special handling is indicated for the scheduling request, and the scheduling request is the only expected uplink control information, select the uplink control decoding path to be the PUSCH directly. Otherwise, proceed to Positive SR hypothesis (explained below).

Alternative 2: When no special handling for the scheduling request is indicated and the scheduling request is the only expected uplink control information, or when other uplink control information is expected, proceed to Positive SR hypothesis.

Positive SR hypothesis: Attempt to decode the scheduling request and other control information on the PUCCH. If this is successful select the uplink control decoding path to be the PUCCH.

Otherwise, select the uplink control decoding path to be the PUSCH.

Once the uplink transmission path is decided, UE SRS, frequency tracking loop, timing tracking loop, and SNR (signal to noise ratio) report will all be selected from the same source.

Figure 5:
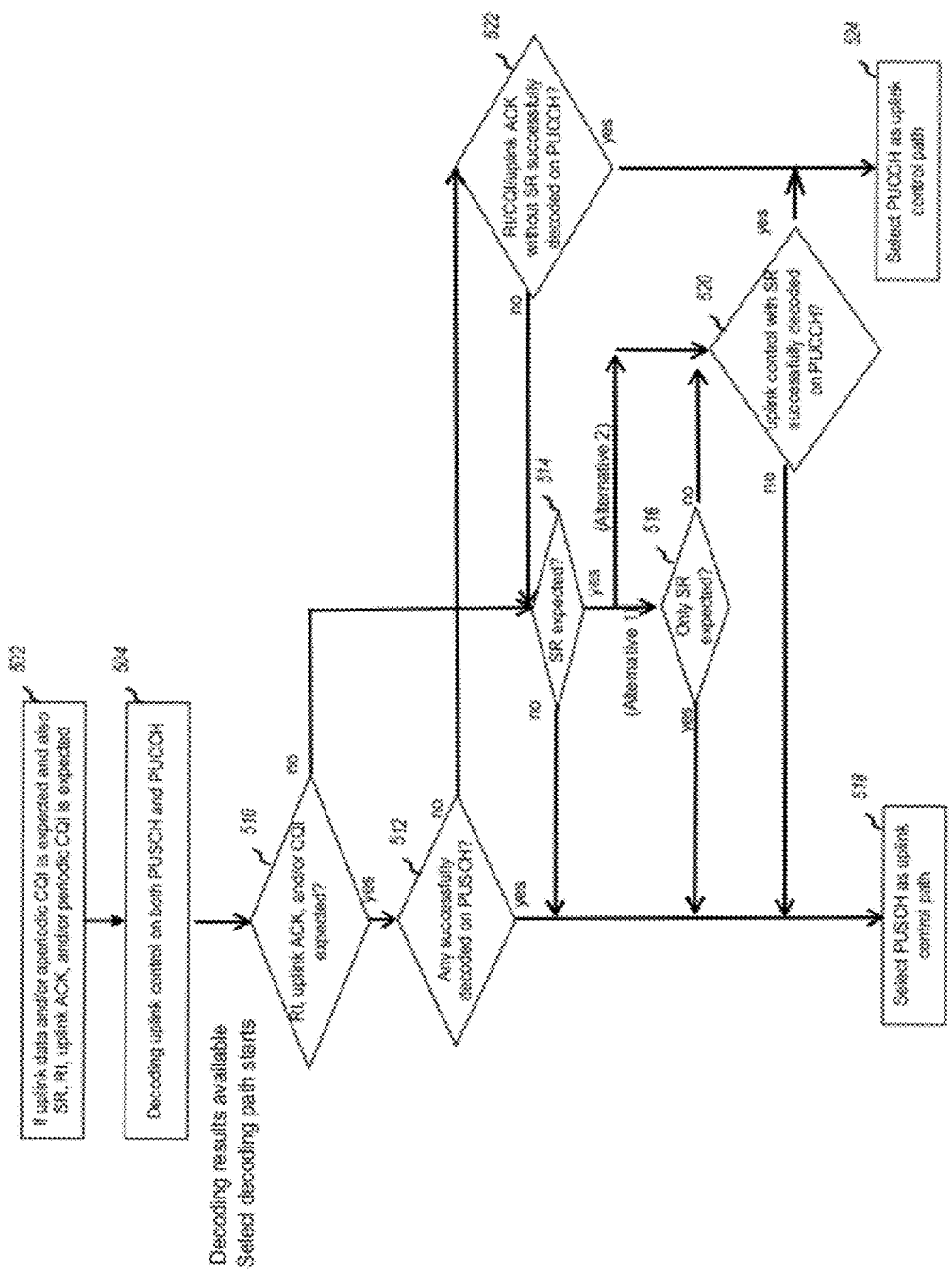
FIG. 5 is a flow chart illustrating a method for communicating in a wireless network according to one aspect of the disclosure.

A flow diagram illustrating the above rule is seen in FIG. 5. If uplink data, and/or aperiodic CQI is expected, and also scheduling request, rank indicator, uplink ACK, and/or periodic CQI are expected, as shown in block 502, an attempt to decode the uplink control information occurs as shown in FIG. 5.

On the control channel, PUCCH, when a scheduling request is multiplexed with uplink ACK and/or CQI, a base station may use blind decoding to decode uplink control information on the control channel, PUCCH. A negative SR (scheduling request) hypothesis is as if there is no scheduling request at all. A positive SR hypothesis, meaning a scheduling request is included, may result in an eNB decoding uplink ACK at the scheduling requests resource location (n_PUCCH_1) if there is uplink ACK and a positive SR. Or a positive SR hypothesis may result in CQI being dropped if there is CQI and a positive SR.

The process starts once decoding is attempted on both the data channel, PUSCH, and control channel, PUCCH, as shown in block 504. The results are stored in memory and processed as described below. When the decoding results are available, a process for determining the decoding path according to one aspect is shown. In block 510 it is determined whether rank indicator, uplink ACK, and/or CQI are expected. If they are, at block 512 it is determined if any of the rank indicator, uplink ACK, and/or CQI are successfully decoded on the data channel, PUSCH. If they are successfully decoded, then the data channel, PUSCH, is selected as the uplink control path as shown in block 518. If they are not successfully decoded, in block 522, it is determined if any of the rank indicator, uplink ACK, and/or CQI without a scheduling request are successfully decoded on the control channel, PUCCH. If any are, the control channel, PUCCH is selected as the uplink control path, as shown in block 524.

If rank indicator, uplink ACK, and/or CQI are not expected on the data channel, PUSCH, path (block 510:NO) then in block 514, it is determined whether a scheduling request is expected. Similarly, if rank indicator, uplink ACK, and/or CQI are not successfully decoded on the control channel, PUCCH, path (block 522:NO), at block 514, it is determined whether a scheduling request is expected.

If a scheduling request is not expected in block 514, then the data channel, PUSCH, is selected as the uplink control path as shown in block 518. If a scheduling request is expected, then one of two alternatives may be selected. In the first alternative (when special handling for the scheduling request is indicated, as defined in 3GPP Release 8), it is determined (as shown in block 516) if only a scheduling request is expected. If the answer is yes, then the data channel, PUSCH, is selected as the uplink control path as shown in block 518. If the answer is no, and other signals are expected, the process continues with block 520. In the second alternative (when no special handling is indicated), if a scheduling request is expected (block 514:YES) the process continues with block 520.

In block 520 the process checks whether any uplink control data with scheduling requests is successfully decoded on the control channel, PUCCH, path. If it is, then the control channel, PUCCH, is selected as the uplink control path as shown in block 524. If not, then the data channel, PUSCH, is selected as the uplink control path as shown in block 518.

The PUSCH vs. PUCCH blind decoding rule illustrated above does not depend on a data channel, PUSCH, decoding result such as signal-to-noise ratio (SNR) and/or cyclic redundancy check (CRC) which may cause the data channel, PUSCH, to take longer to decode than the control channel, PUCCH. If delays were present, timing critical uplink control information, such as uplink ACK, might not meet the downlink HARQ processing deadline.

For non-timing critical uplink control information, the data channel, PUSCH, decoding result can be utilized. If the data channel, PUSCH, and/or aperiodic CQI CRC are decoded, or its signal to noise ratio (SNR) is above a certain threshold, the uplink control information decoding path may be chosen to be the data channel, PUSCH. Otherwise, the uplink control information decoding path may be chosen to be the control channel, PUCCH.

Once the uplink transmission path is decided, UE sounding reference signals (SRS), frequency tracking loop (FTL), timing tracking loop (TTL), and signal to noise ratio (SNR) may be selected from the same source.

Figure 6:
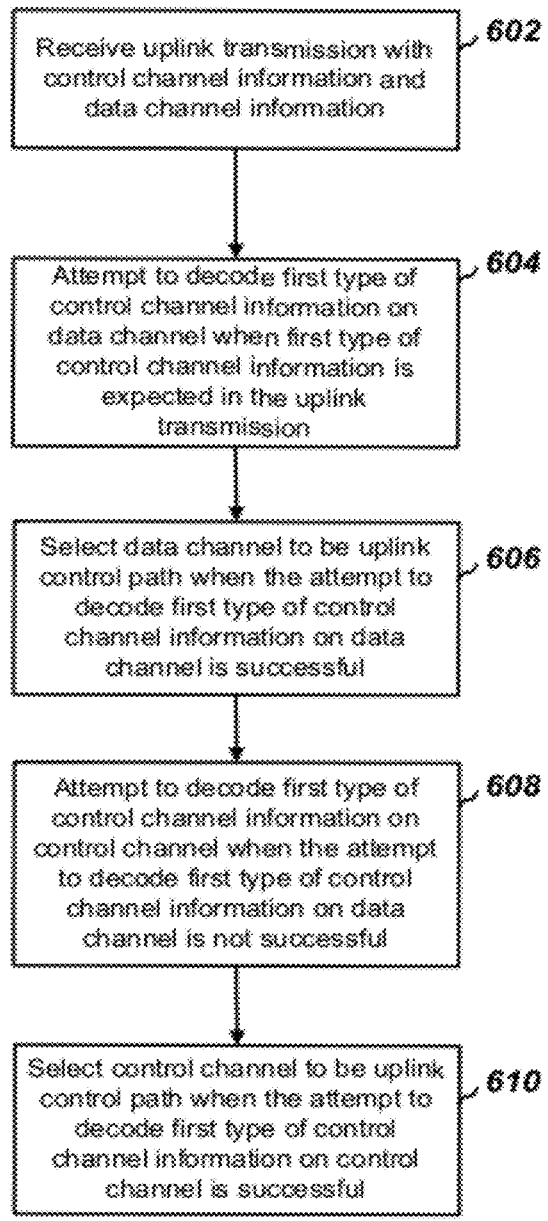
FIG. 6 is a flow chart illustrating a method for communicating in a wireless network according to one aspect of the disclosure.

FIG. 6 is a functional block diagram illustrating example blocks executed to implement one aspect of the present disclosure. In block 602 a base station receives an uplink transmission including control channel information and data channel information. In block 604 the base station attempts to decode a first type of control channel information on a data channel when the first type of control channel information is expected in the uplink transmission. In block 606 the base station selects the data channel to be an uplink control path when the attempt to decode the first type of control channel information on the data channel is successful. In block 608 the base station attempts to decode the first type of control channel information on a control channel when the attempt to decode the first type of control channel information on the data channel is not successful. In block 610 the base station selects the control channel to be the uplink control path when the attempt to decode the first type of control channel information on the control channel is successful.

In one configuration, the apparatus, for example the eNodeB 110, for wireless communication includes means for receiving an uplink transmission, means for attempting to decode control channel information, and means for selecting an uplink control path. In one aspect, the aforementioned means for receiving may be the antennas 434a-t and/or the receive processor 438 configured to perform the functions recited by the aforementioned means. In one aspect, the aforementioned means for attempting to decode may be the receive processor 438, controller/processor 440 and/or memory 442 configured to perform the functions recited by the aforementioned means. In one aspect, the aforementioned means for selecting an uplink control path may be the controller/processor 440 and/or memory 442 configured to perform the functions recited by the aforementioned means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving an uplink transmission including control channel information and data channel information;
   attempting to decode a first type of control channel information on a data channel when the first type of control channel information is expected in the uplink transmission;
   selecting the data channel to be an uplink control path when a second type of control channel information is not expected in the uplink transmission, when the first type of control channel information is not expected in the uplink transmission or when the attempt to decode the first type of control channel information on the control channel is not successful;
   attempting to decode the first type of control channel information on a control channel when the attempt to decode the first type of control channel information on the data channel is not successful; and
   selecting the control channel to be the uplink control path when the attempt to decode the first type of control channel information on the control channel is successful.

2. The method of claim 1 in which the second type of control channel information is a scheduling request.

3. The method of claim 1 further comprising, selecting the data channel to be the uplink control path when a second type of control channel information is expected in the uplink transmission and when special handling of the second type of control channel information is indicated, when the first type of control channel information is not expected in the uplink transmission.

4. The method of claim 1 further comprising:
   attempting to decode a second type of control channel information and the first type of control channel information on the control channel when special handling is not indicated;
   selecting the control channel to be the uplink control path when the attempt to decode the second type of control channel information and the first type of control channel information on the control channel is successful; and
   selecting the data channel to be the uplink control path when the attempt to decode the second type of control channel information and the first type of control channel information on the control channel is not successful.

5. The method of claim 4 in which the attempting to decode the second type of control channel information and the first type of control channel information on the control channel occurs when:
   no special handling of the second type of control channel information is indicated, or
   when special handling of the second type of control channel information is indicated and the first type of control channel information is expected.

6. The method of claim 1 further comprising, in accordance with the selected uplink control path:
   decoding sounding reference signals; and
   calculating frequency tracking loop, timing tracking loop, and signal to noise ratio.

7. The method of claim 1 in which the first type of control channel information is any combination of a channel quality indicator (CQI), a rank indicator (RI), and an uplink acknowledgement (UL-ACK).

8. The method of claim 1 in which the data channel is a Physical Uplink Shared Channel (PUSCH) and the control channel is a Physical Uplink Control Channel (PUCCH).

9. The method of claim 1 in which the first type of control channel information is any combination of a channel quality indicator (CQI), a rank indicator (RI), an uplink acknowledgement (UL-ACK), a cyclic redundancy check (CRC) and a signal-to-noise ratio (SNR).

10. An apparatus for wireless communication comprising:
   means for receiving an uplink transmission including control channel information and data channel information;
   means for attempting to decode a first type of control channel information on a data channel when the first type of control channel information is expected in the uplink transmission;
   means for selecting the data channel to be an uplink control path when a second type of control channel information is not expected in the uplink transmission, when the first type of control channel information is not expected in the uplink transmission or when the attempt to decode the first type of control channel information on the control channel is not successful;
   means for attempting to decode the first type of control channel information on a control channel when the attempt to decode the first type of control channel information on the data channel is not successful; and
   means for selecting the control channel to be the uplink control path when the attempt to decode the first type of control channel information on the control channel is successful.

11. A computer program product for wireless communication comprising:
   a non-transitory computer-readable medium having non-transitory program code recorded thereon, the program code comprising:
      program code to receive an uplink transmission including control channel information and data channel information;
      program code to attempt to decode a first type of control channel information on a data channel when the first type of control channel information is expected in the uplink transmission;
      program code to select the data channel to be an uplink control path when a second type of control channel information is not expected in the uplink transmission, when the first type of control channel information is not expected in the uplink transmission or when the attempt to decode the first type of control channel information on the control channel is not successful;
      program code to attempt to decode the first type of control channel information on a control channel when the attempt to decode the first type of control channel information on the data channel is not successful; and
      program code to select the control channel to be the uplink control path when the attempt to decode the first type of control channel information on the control channel is successful.

12. An apparatus for wireless communication comprising:
   a memory; and
   at least one processor coupled to the memory, the at least one processor being configured:
      to receive an uplink transmission including control channel information and data channel information;
      to attempt to decode a first type of control channel information on a data channel when the first type of control channel information is expected in the uplink transmission;
      to select the data channel to be an uplink control path when a second type of control channel information is not expected in the uplink transmission, when the first type of control channel information is not expected in the uplink transmission or when the attempt to decode the first type of control channel information on the control channel is not successful;
      to attempt to decode the first type of control channel information on a control channel when the attempt to decode the first type of control channel information on the data channel is not successful; and
      to select the control channel to be the uplink control path when the attempt to decode the first type of control channel information on the control channel is successful.

13. The apparatus of claim 12 in which the second type of control channel information is a scheduling request.

14. The apparatus of claim 12 in which the at least one processor is further configured to select the data channel to be the uplink control path when a second type of control channel information is expected in the uplink transmission and when special handling of the second type of control channel information is indicated, when the first type of control channel information is not expected in the uplink transmission.

15. The apparatus of claim 12 in which the at least one processor is further configured:
   to attempt to decode a second type of control channel information and the first type of control channel information on the control channel when special handling is not indicated;
   to select the control channel to be the uplink control path when the attempt to decode the second type of control channel information and the first type of control channel information on the control channel is successful; and
   to select the data channel to be the uplink control path when the attempt to decode the second type of control channel information and the first type of control channel information on the control channel is not successful.

16. The apparatus of claim 15 in which the at least one processor is further configured to attempt to decode the second type of control channel information and the first type of control channel information on the control channel occurs when:
   no special handling of the second type of control channel information is indicated, or
   when special handling of the second type of control channel information is indicated and the first type of control channel information is expected.

17. The apparatus of claim 12 in which the at least one processor is further configured, in accordance with the selected uplink control path:
   to decode sounding reference signals; and
   to calculate frequency tracking loop, timing tracking loop, and signal to noise ratio.

18. The apparatus of claim 12 in which the first type of control channel information is any combination of a channel quality indicator (CQI), a rank indicator (RI), and an uplink acknowledgement (UL-ACK).

19. The apparatus of claim 12 in which the data channel is a Physical Uplink Shared Channel (PUSCH) and the control channel is a Physical Uplink Control Channel (PUCCH).

20. The apparatus of claim 12 in which the first type of control channel information is any combination of a channel quality indicator (CQI), a rank indicator (RI), an uplink acknowledgement (UL-ACK), a cyclic redundancy check (CRC) and a signal-to-noise ratio (SNR).

* * * * *